July 8, 1969 — J. CHIU — 3,453,864

TEST CELL FOR THERMAL ANALYSIS

Filed Aug. 23, 1965

INVENTOR
JEN CHIU

BY *Herbert M. Wolfson*
ATTORNEY

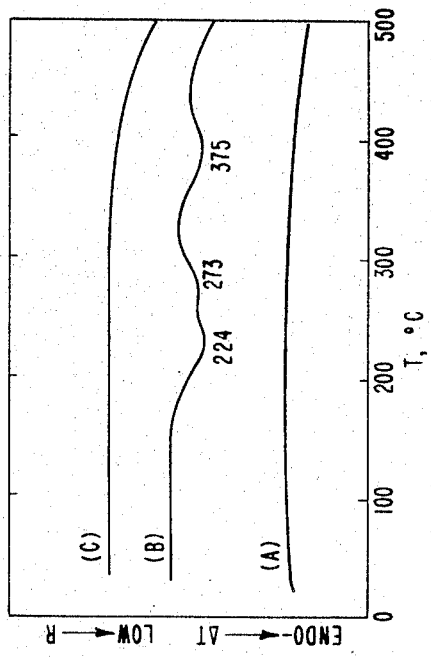
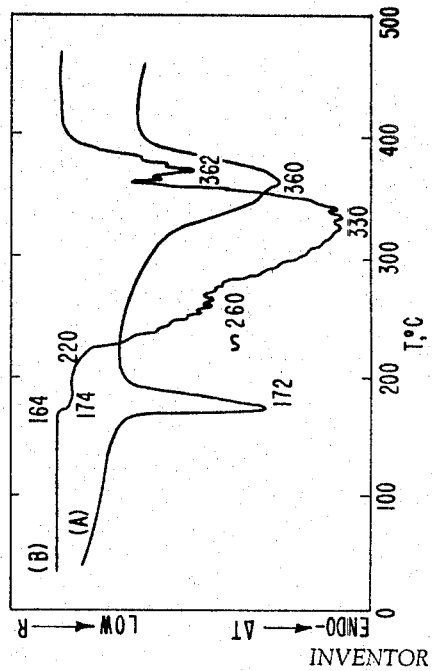
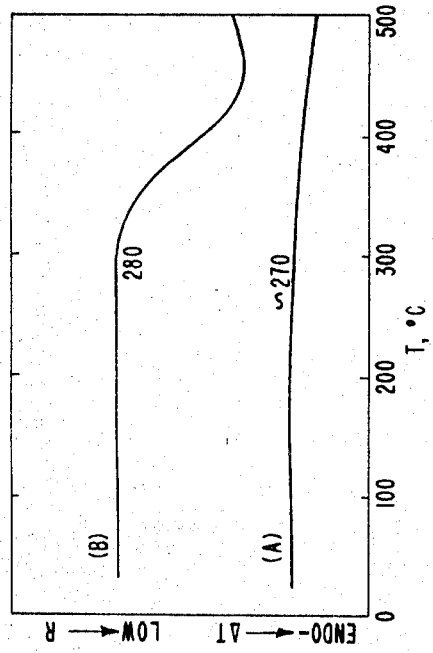
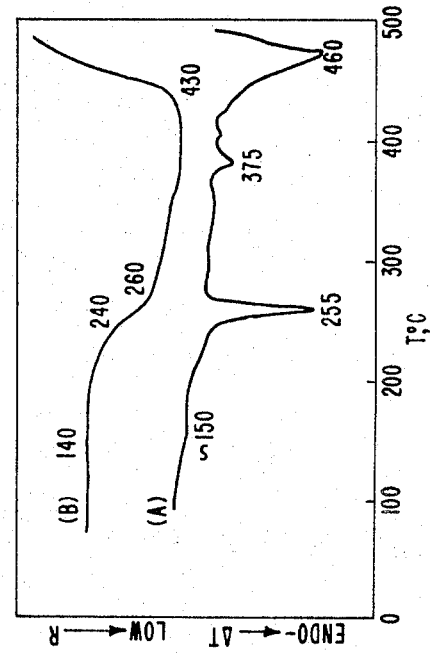

United States Patent Office 3,453,864
Patented July 8, 1969

3,453,864
TEST CELL FOR THERMAL ANALYSIS
Jen Chiu, Wilmington, Del., assignor to E. I. du Pont de Nemours and Company, Wilmington, Del., a corporation of Delaware
Filed Aug. 23, 1965, Ser. No. 481,696
Int. Cl. G01n 25/18
U.S. Cl. 73—15                                    3 Claims

ABSTRACT OF THE DISCLOSURE

A test cell for measuring changes in the electrical resistivity as a function of temperature of relatively small quantities of material is composed of two concentric cylindrical electrodes with the sample disposed at least partially between the electrodes. The means for measuring the temperature of the sample is preferably disposed within the central opening of the inner electrode.

---

This invention relates to a novel test cell for thermal analysis and, more particularly, to a test cell and a method for using such cell in measuring changes in the electrical conductivity or resistivity of materials as a function of temperature or as a function of time at a constant temperature.

The primary object of this invention is to provide an apparatus and method for using electrical resistivity measurements to study such physical transitions as melting, crystallization, glass transition, crystalline structural changes, vaporization, decomposition and the like of solid or liquid materials. It is a further object to provide such an apparatus and method that will function on relatively small quantitties of materials with improvements in precision, accuracy, sensitivity and resolution. A still further object is to provide an apparatus and method for performing this so-called electrothermal analysis in a continuous manner, which apparatus and method can be easily adapted to perform differential thermal analysis in a similarly continuous manner simultaneously with the electrothermal analysis. Other objects will appear hereinafter.

The elements of an electrothermal analysis apparatus are: a sample receptacle or container, means for heating the sample in a controlled manner, means for measuring the temperature of the sample, and means for measuring the electrical resistivity of the sample. Basically, these elements may be divided into the heater and the test cell, the latter comprising the remaining elements. As the means for heating in a controlled manner, one may use furnaces heated in any manner, i.e., induction coils, resistance heaters, combustion heaters, etc.; heat conductive blocks adapted to receive the test cell, the block being heated by any of the aforementioned methods; wire wound directly about the test cell and adapted when current is applied to the wire to heat the cell, etc. As test cells, the one shown in U.S. Patent No. 3,147,432 is the most common. This cell requires relatively large quantities of sample and cannot readily be used in a continuous manner.

The test cell of the present invention is composed of a sample container, usually tubular; a first cylindrical or tubular electrode adjacent the inner wall of the container, conforming substantially to the inner wall of the container or coated on this wall when the container is tubular; a second cylindrical or tubular electrode within the first electrode, spaced from the first electode and concentric therewith, the electrodes connected to each other through an external power source, preferably but not limited to a DC power source, adapted to measure the resistivity of a sample disposed at least partially between said electrodes; and temperature-sensing means spaced from but disposed within the central opening of the cylindrical second electrode adapted to be inserted into the sample to measure the temperature thereof.

The invention will be more clearly understood and the facility with which it can be adapted for use in conjunction with differential thermal analysis apparatus will be readily apparent from the following description when read in conjunction with the drawing in which:

FIGURES 3 through 6 represent thermograms in which the results of electrothermal analysis and differential thermal analysis are plotted for various materials.

Figure 1:
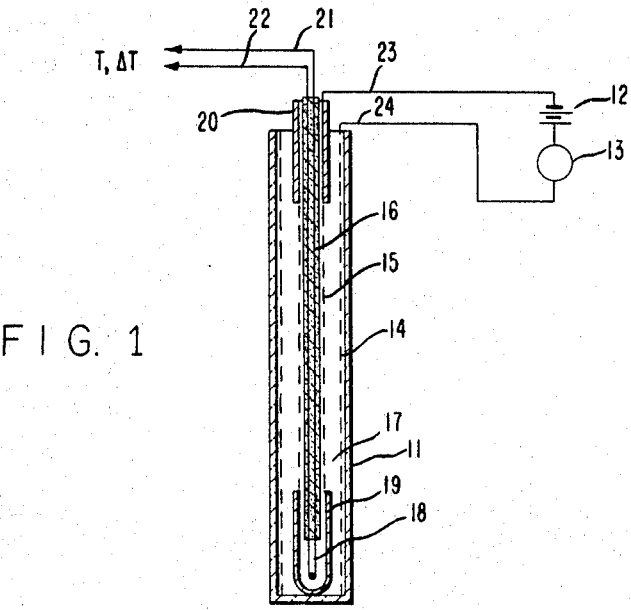
FIGURE 1 is a view, partly in section, of apparatus embodying the important features of the invention.

Referring to FIGURE 1, the test cell container 11 is shown for use with suitable electrical measuring apparatus, the latter composed of a DC source 12 and an electrometer 13. The container 11 is cylindrical, usually of glass or other ceramic material, 4–6 millimeters in diameter, 1–1.5 inches long, and contains outer and inner metal cylinders or tubes 14 and 15. Specifically, the outer cylinder 14 may be a platinum or aluminum foil or coating that conforms substantially to the inner surface of the container 11. The inner cylinder 15 may be a platinum or aluminum foil or coating wrapped or coated on a ceramic insulation tube 16, the inner cylinder 15 being concentric with the outer cylinder 14. The inner cylinder 15 may be insulated from the outer cylinder 14 by spacer 20. Between the cylinders 14 and 15 is defined an annular chamber 17 for receiving the sample to be tested. The amount of sample may be anywhere from 10 milligrams to 100 milligrams.

The temperature-sensing means, a thermocouple 18, is disposed within the center of the inner cylinder 15. The thermocouple 18 may probe directly into the sample in container 11; or, if desired, a separate capillary tube 19 containing a quantity of the sample and adapted to receive the thermocouple 18 may be used. The thermocouple may be any of those that are useful to temperatures of 1000° C. or higher. Thus, 40-gauge to 28-gauge Chromel-Alumel, copper-constantan or platinum-platinum, rhodium thermocouples are preferred. Alternatively, resistance thermometers, thermistors, bolometers, etc. may be used. In short, any temperature-sensing means known to those skilled in the art that will measure temperature from −200 to 1500° C. and provide an electrical output reflecting the temperature measured may be used.

Figure 2:
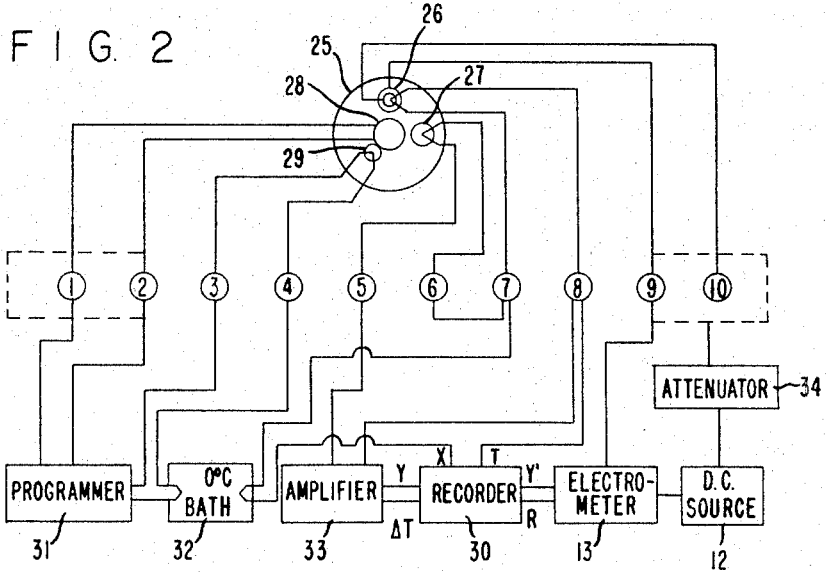
FIGURE 2 is a circuit diagram of the embodiment of the invention wherein the electrothermal analysis apparatus is combined with differential thermal analysis apparatus.

The leads 21 and 22 from thermocouple 18 may be connected to a voltmeter, not shown, or directly to the recording means 30 shown in FIGURE 2 which automatically records the temperature of the sample along the X-axis. The connections 23 and 24 from the cylindrical electrodes 14 and 15 are usually 30-gauge platinum wire and lead to the battery 12 and electrometer 13, a modified ammeter, which provides readings of the resistivity of the sample. These readings are fed to the recorder 30 where they are recorded along the Y-axis simultaneously with the temperature reading along the X-axis. The foregoing elements together with the heating means and the temperature programmer 31, to be described subsequently, comprise the elements required for electrothermal analysis, i.e., to measure resistivity of a sample as a function of temperature and/or time. Ordinarily, the electrometer 13 will have a sensitivity ranging from $10^{-6}$ to $3\times10^{-14}$ amperes. For less sensitive ranges, an attenuator 34 may be included in the circuit.

In operation, the test cell may be placed in a furnace or a cell block 25 as shown schematically in FIGURE 2. The cell block 25, usually of aluminum, is used as a heat sink containing a center cartridge heater and is more fully described in U.S. Patent 3,117,438. As shown in FIGURE 2, the cell block contains four wells. The test cell 11 is placed in one of the wells 26. The reference cell for differential thermal analysis is placed in a second well 27. The previously-mentioned heater is in the central well 28. The block also contains a small diameter well 29, preferably located close to the heater, adapted to receive a small glass capillary tube which contains a temperature-sensing means, a Chromel-Alumel thermocouple, for controlling the operation of the temperature programmer 31.

All the electrical connections may be arranged on a numbered terminal strip. A water triple-point cell 32 may be used as the reference junction to provide a 0° C. reference point for the temperature measurements. The heater in well 28 is connected to the temperature programmer 31 through taper pins 1 and 2. The temperature programming thermocouple in opposition to the "bucking" potential from a similar thermocouple placed in the water triple-point cell 32 is connected to the temperature programmer 31 through pins 3 and 4. The thermocouple in the sample 31 through pins 3 and 4. The thermocouple in the sample cell in well 26 is connected to pins 7 and 8 while the thermocouple in the reference cell in well 27 is connected to pins 5 and 6. The two electrodes 14 and 15 of the test cell 11 in well 26 are connected to pins 9 and 10 for the resistivity measurement.

When heat is applied to the cell block 25 through the heater, the thermocouple in well 29 connected to the programmer 31 and the heat source provides for heating the cell in a controlled, usually linear manner. The thermocouple in the sample cell is used to measure the temperature of the sample, the output being corrected through the reference junction in cell 32 and then fed to the recorder 30, the temperature being recorded along the X-axis. The output of the sample thermocouple is also compared to the output of the reference thermocouple, the difference being amplified at 33 and the amplified output being fed to the recorder 30 where ΔT is recorded along the Y-axis. At the same time the resistivity that is obtained from the electrometer 13 is fed into the recorder 30 as Y' for recording along the Y-axis. Thus, the difference in temperature and the resistivity are recorded simultaneously as a function of temperature as the temperature programmer arranges to raise the temperature of the sample in the previously-mentioned controlled manner. Resistivity and/or ΔT may be recorded in an arithmetic or logarithmic scale. Although the operation has been described for the combined electrothermal and differential thermal analyses, it will be apparent that the description is applicable to electrothermal analysis alone by merely eliminating the reference cell.

The utility and the importance of the invention will become apparent from a consideration of the following examples.

EXAMPLE 1

A thermogram of glass beads was obtained by using the combination of the differential thermal analysis and electrothermal analysis methods previously described. Curve A of FIGURE 3, the differential thermal analysis curve, provides no detectable thermal effects in heating the beads from room temperature to 500° C. However, as indicated in Curve B, the scan obtained by electrothermal analysis showed changes in the resistivity with increasing temperatures. The peak positions at approximately 224° C., 273 C., and 375 C. are indicative of the volatilization of impurities. These peaks disappear on recycliing as shown in Curve C with only a tailing remaining at relatively high temperatures due to the increased conductivity of the glass beads at these high temperatures. Thus, electrothermal analysis provides an improved method for determining the purity of materials.

EXAMPLE 2

In this example, a thermogram was obtained by employing simultaneously differential thermal analysis and electrothermal analysis for a very thermally stable polymer, a polyimide, using a 10–50 milligram sample. It will be noted in FIGURE 4 that the differential thermal analysis curve, Curve A, showed only an apparent gradual endothermic effect starting at about 270° C.

On the other hand, the electrothermal analysis curve, Curve B, showed a distinct resistivity decrease beginning at 280° C. which passed through a maximum at about 460° C. Hence, it would appear that the resistivity measurements offer a far greater sensitivity than the ordinary differential thermal analysis technique in the determination of thermal stability, particularly when only small samples are available.

EXAMPLE 3

A polymer of formaldehyde was analyzed using the technique of the invention. The thermograms are shown FIGURE 5. It will be noted that differential thermal analysis in Curve A provided an endotherm that peaked at 172° C. due to the melting of the polymer and a broad large endotherm that peaked at about 360° C. due to degradation of the polymer. The exact temperature at which degradation begins could not be measured because of the gradualness of the endothermic effect.

On the other hand, the electrothermal analysis curve, Curve B, showed a steep resistivity decrease from 164° C. to 174° C. corresponding to the melting of the polymer. Thereafter, the resistivity of the polymer decreased slowly until 220° C. where it began decreasing at a much greater rate and finally produced a huge complex peak, the maximum of this complex peak being located at about 330° C., which corresponded to the maximum rate of degradation. However, the two shoulders of the curve shown at 260° C. and 362° C. would seem to indicate that degradation of polyformaldehyde is not as simple as suggested by the single peak obtained in the differential thermal analysis scan.

EXAMPLE 4

In this example, nylon 66 was analyzed by the technique of the invention. Electrothermal analysis, as illustrated in Curve B, showed a decrease in the resistivity of the sample as early as 140° C. with an increasing rate beginning at about 240° C. The resistivity change from 240° C. to 260° C. in the electrothermal analysis scan corresponds to the melting endotherm shown by differential thermal analysis in Curve A at 255° C. The reduction in resistivity just prior to melting confirms a theory that the amide protons are largely responsible for conductivity and that a crystalline transition probably takes place prior to melting to permit free rotation of the amide chains. As degradation of this polymer proceeds after melting, the resistivity continues to decrease until a reversal of this effect is obtained at a temperature of about 430° C.

From the foregoing examples, it will be apparent that the use of the novel electrothermal analysis cell in accordance with the present invention offers an important analytical tool where quantities are limited and automatic recording is desired. It is also apparent that the combined use of differential thermal analysis and electrothermal analysis, in the manner set forth herein, can provide more information on the nature and behavior of polymers which either technique could provide alone. The apparatus of the invention can perform this dual analysis simultaneously over a wide range of temperatures on a sample that may be as small as 10 milligrams; and the operation is rapid and simple. The sample cells, the electrodes and the temperature-sensing means are disposable and easily replaced.

Besides being useful in the analysis of polymers, resins and the like, the technique of this invention can be used for the determination of the polymorphic transitions in inorganic salts, e.g., potassium nitrate, sodium nitrate, etc. The technique can also be used to determine the transitions of sulphur and the dehydration of such inorganic salts as barium chloride dihydrate, copper sulfate pentahydrate, etc. Furthermore, electrothermal analysis using the sample cell of the invention can be used for gas detection by restricting the sample to the bottom of the sample tube while restricting the electrodes to the top of the cell. In this way the bottom portion of the cell can perform differential thermal analysis while the upper portion will serve to detect and measure the electrical conductivity of the vapors only. It should also be understood that the apparatus can be adapted to function in any atmosphere. Thus, nitrogen, oxygen, etc. may be made to flow through the sample during analysis. The sample can be under pressure or a vacuum may be drawn.

Since many different embodiments of the invention may be made without departing from the spirit and scope thereof, it should be understood that the invention is not limited by the specific illustrations presented herein except to be extent defined in the following claims.

What is claimed is:

1. In an electrothermal analysis cell composed of a sample container, means for heating the sample in a controlled manner, means for measuring the temperature of the sample and means for measuring the electrical resistivity of the sample, the improvement wherein means for measuring the electrical resistivity of the sample comprises a first cylindrical electrode adjacent the inner wall of the sample container, a second cylindrical electrode within the first electrode, spaced from the first electrode and concentric therewith, the electrodes connected to each other through an external power source adapted to measure the resistivity of a sample disposed at least partially between said electrodes; and wherein the means for measuring the temperature of the sample is spaced from but disposed within the central opening of the second cylindrical electrode adapted to be inserted into the sample to measure the temperature thereof.

2. Apparatus as in claim 1 wherein said sample container is cylindrical and said first electrode is a metallic coating on the inner wall of said cylindrical container.

3. Apparatus for thermal analysis comprising a cell block; means for heating said block in a controlled manner; a sample container disposed in said block and adapted to be heated in said controlled manner; means for measuring the temperature of said sample continuously; means for measuring the electrical resistivity of said sample continuously, said means comprising a first cylindrical electrode adjacent the inner wall of the sample container, a second cylindrical electrode within the first electrode, spaced from the first electrode and concentric therewith, the electrodes connected to each other through an external power source adapted to measure the resistivity of a sample disposed at least partially between said electrodes; a reference cell disposed in said cell block and adapted to be heated in the same controlled manner as said cell block; and means for measuring the temperature of said reference cell continuously.

References Cited

UNITED STATES PATENTS

| | | | |
|---|---|---|---|
| 3,045,472 | 7/1962 | Paulik | 73—15 |
| 3,209,249 | 9/1965 | Warfield | 324—65 |
| 3,049,410 | 8/1962 | Warfield et al. | 324—65 X |
| 3,217,250 | 11/1965 | Goemann | 324—30 |

OTHER REFERENCES

Revolinsky, E. and Beerntsen, D., Electrical Properties of the $MoTe_2$-$WTe_2$ and $MoSe_2$-$WSe_2$ Systems, in Journal of Applied Physics, 35 (July 1964), pp. 1086–2089.

RICHARD C. QUEISSER, *Primary Examiner.*